United States Patent [19]
Menkhaus et al.

[11] Patent Number: 5,203,644
[45] Date of Patent: Apr. 20, 1993

[54] SYSTEM TO CONTROL CONTAMINATION DURING RETRIEVAL OF BURIED TRU WASTE

[75] Inventors: Daniel E. Menkhaus; Guy G. Loomis; Carlan K. Mullen; Donald W. Scott; Edgar M. Feldman; Leroy C. Meyer, all of Idaho Falls, Id.

[73] Assignee: The United States of America as represented by the United States Department of Energy, Washington, D.C.

[21] Appl. No.: 751,900

[22] Filed: Aug. 29, 1991

[51] Int. Cl.[5] .............................................. B09B 1/00
[52] U.S. Cl. .................................. 405/128; 52/169.1; 299/12; 299/18
[58] Field of Search ............... 405/128, 129; 299/7, 299/12, 18; 55/385.2, DIG. 9; 252/626, 633; 52/169.1

[56] References Cited
U.S. PATENT DOCUMENTS

| | | | |
|---|---|---|---|
| 3,505,989 | 4/1970 | Truhan | 55/385.2 X |
| 3,766,844 | 10/1973 | Donnelly et al. | 55/385.2 X |
| 3,785,125 | 1/1974 | DeSeversky | 55/119 |
| 4,681,706 | 7/1987 | Mallory et al. | 252/633 |
| 4,714,293 | 12/1987 | Watson | 299/12 |
| 5,090,972 | 2/1992 | Eller et al. | 55/385.2 X |

*Primary Examiner*—Dennis L. Taylor
*Assistant Examiner*—John Ricci
*Attorney, Agent, or Firm*—Tyrone Davis; Thomas G. Anderson; William R. Moser

[57] ABSTRACT

A system to control contamination during the retrieval of hazardous waste comprising an outer containment building, an inner containment building, within the outer containment building, an electrostatic radioactive particle recovery unit connected to and in communication with the inner and outer containment buildings, and a contaminate suppression system including a moisture control subsystem, and a rapid monitoring system having the ability to monitor conditions in the inner and outer containment buildings.

11 Claims, 7 Drawing Sheets

SYSTEM TO CONTROL CONTAMINATION DURING RETRIEVAL OF BURIED TRU WASTE

CONTRACTUAL ORIGIN OF THE INVENTION

The United States Government has rights in this invention pursuant to Contract No.DE-AC07-76ID01570 between the United States Department of Energy and EG&G Idaho.

BACKGROUND OF THE INVENTION

Between 1950 and 1970 the Department of Energy's Rocky Flats Plant generated transuranic (TRU) contaminated waste, which was buried at the Idaho National Engineering Laboratory. This waste must now be retrieved and sent to a permanent disposal site During retrieval the main contaminates to be controlled are compounds of plutonium and americium. Since these substances are small sized, and extremely mobile, airborne concentrations must be kept to a minimum to effectively eliminate personnel uptake during retrieval operations. This invention relates to a system to control contamination due to TRU airborne particles and was developed consisting of an outer containment building, an inner containment area, a dust suppression system including an electrostatic contaminate capture subsystem, a contamination control system including a moisture control subsystem, a rapid monitoring subsystem, and a lifting and moving system including recovery and repackaging subsystems.

Prior to the development of the contaminate control system, the primary means for the control of airborne TRU particles of plutonium and americium was the control of the moisture content of the soil in and around the dig site. The addition of moisture to the surface soil of a dig is a well known method of dust control used by many industries. However, effective monitoring and control of the airborne particles by moisture addition alone cannot, as a sole means of containment, meet the stringent requirements imposed by the federal and state governments for TRU waste sites. The present invention provides for a contaminate recovery system that incorporates a self contained means for retrieval and repackaging of TRU waste, and a novel electrostatic radioactive particle containment procedure.

SUMMARY OF THE INVENTION

In the invention, an outer containment building is constructed around the proposed dig site. Either concrete or temporary foundation supports for the structure may be constructed, dependent upon the anticipated length of service and climate conditions for the area. A mobile inner containment building, for enclosing the immediate excavation area, provides isolation and containment for either robotic or manned work crews. Outside of the inner containment area but within the outer containment building, the lifting and moving system has a repackaging and recovery area which allows for repackaging and temporary storage of the TRU waste. The contamination suppression system's moisture control subsystem operates throughout the outer containment building spraying the site with water or chemical compounds at various intervals, as a means to control the dust during recovery operations.

The electrostatic radioactive particle recovery subsystem a feature of the dust suppression system, operates in an air sweep and circulation system. This subsystem attracts particles from the circulating air within the closed system and provides an electrostatic method of recovering airborne radioactive particles. In theory, alpha-emitting materials such as, plutonium-239 and americium-241 develop a positive charge due to loss of electrons with each alpha emission. Dust particles have been found to be negatively charged and are captured by passing them past positively charged plates, effectively creating a curtain for these types of particles.

A rapid monitoring subsystem monitors the areas within the outer containment building to determine the various contaminate levels, and report conditions in the environment when they rise above recommended levels, allowing for either manual or computer control of the moisture control and electrostatic radioactive particle recovery subsystems.

It is a object of the invention to provide an environmentally safe system for the recovery of contaminated waste.

It is another object of the invention to provide a method of electrostatic radioactive particle recovery.

Additional objects, advantages and novel features of the invention will be set forth in part in the description which follows, and in part will become apparent to those skilled in the art upon examination of the following or may be learned by practice of the invention. The objects and advantages of the invention ma be realized and attained by means of the instrumentalities and combinations particularly pointed out in the appended claims.

To achieve the foregoing and other objects and in accordance with the purpose of the present invention, as embodied and broadly described herein, the invention may comprise an outer containment building, an inner containment area, a contaminate suppression system, a moisture control subsystem, a dust suppression system, an electrostatic contaminate capture subsystem, a contaminate rapid monitoring subsystem, and a lifting and moving system including a contaminate recovery and repackaging subsystem.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

Figure 1:
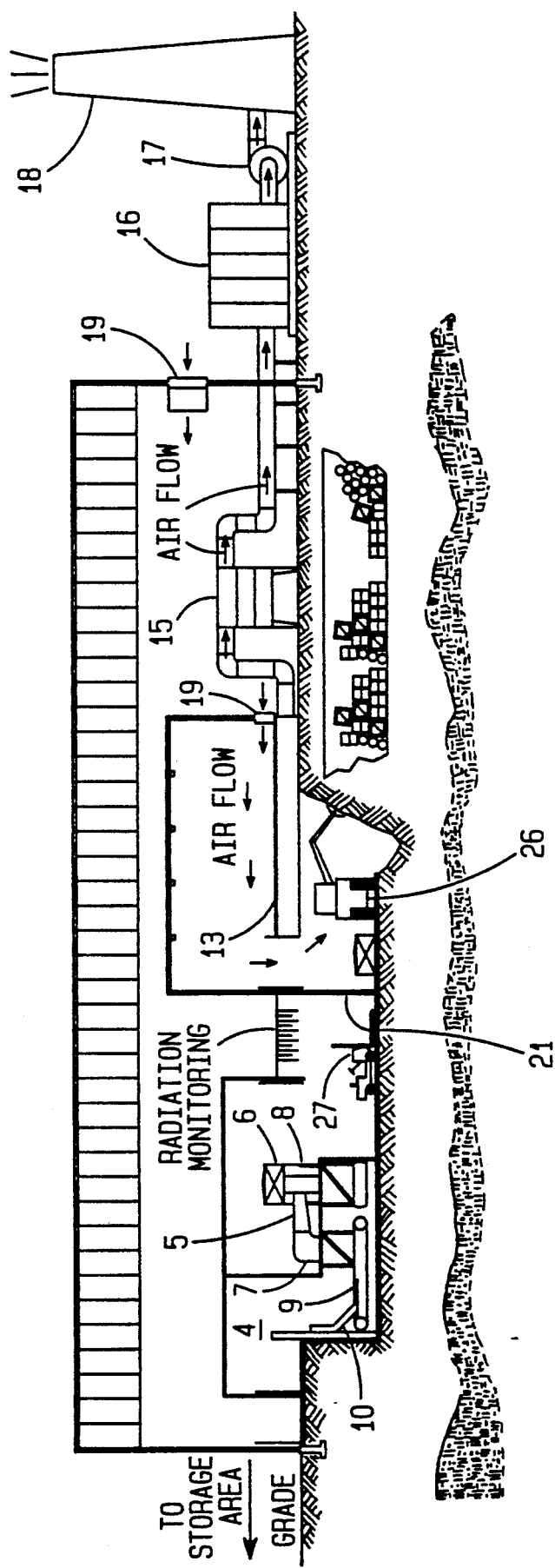
FIG. 1 shows an embodiment of the contamination control system.
Figure 2:
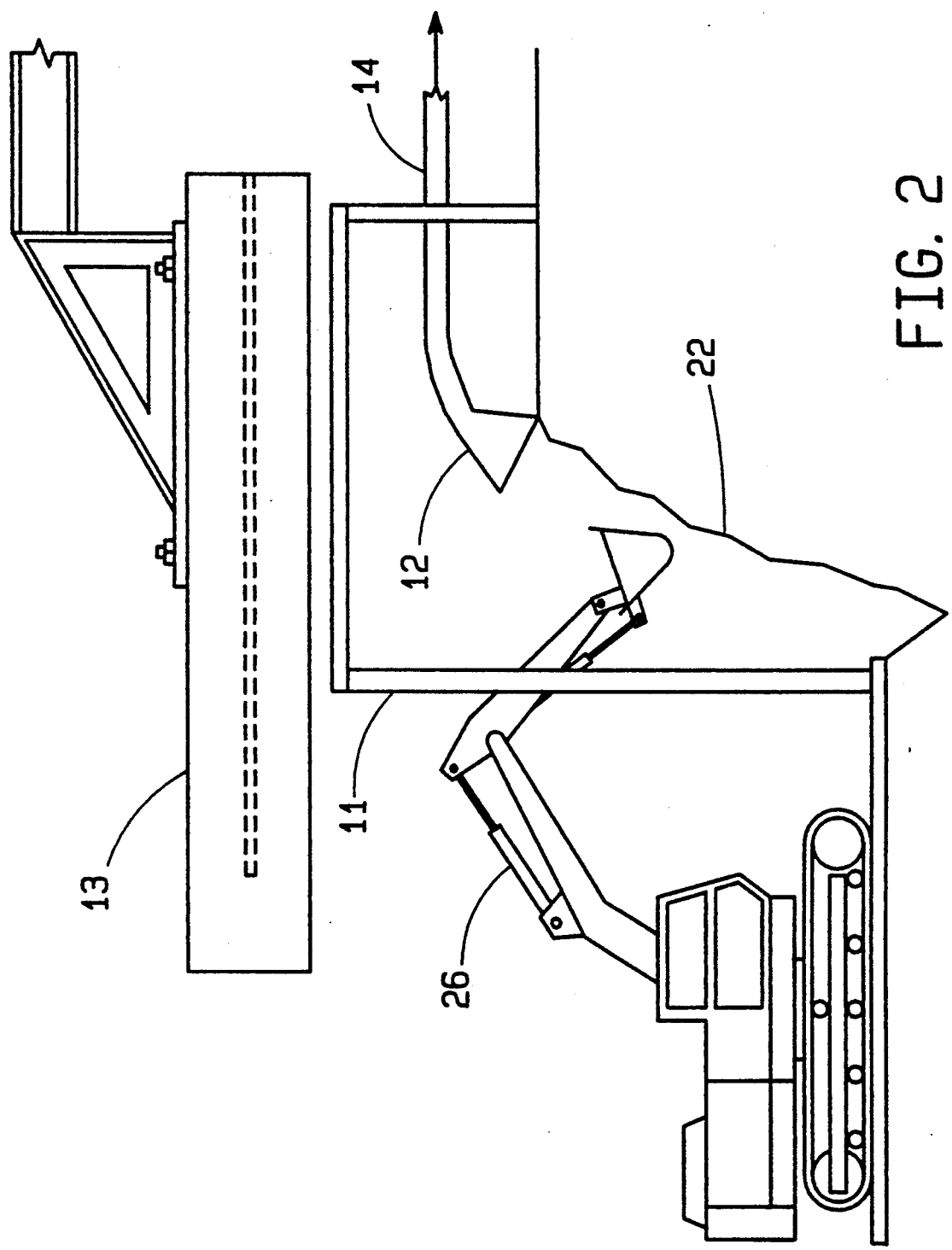
FIG. 2 shows an embodiment of the inner containment area, with negatively charged hardened sheets.

Referring to FIGS. 1 and 2, the entire excavation site is contained within an outer containment building 1. This structure is a typical post and I-beam construction that has either an aluminum or fiberglass outer shell. Negatively charged plastic sheets 3 are strategically placed along the inner side of the outer shell to capture airborne radioactive particles. A recovery and repackaging area 4 is located within the outer containment building. In operation, recovered waste is deposited into segregation equipment 5 consisting of a shaker 6, trommel 7, and packaging machines 8. The waste is then removed from its old container and the container and waste matter are repackaged. The repackaged waste matter then travels along a conveyor 9 to an automatic lift 10 where it is placed into temporary storage. FIG. 2 shows an embodiment of an inner containment area 11 constructed entirely of negatively charged hardened plastic sheets to act as a radioactive particle suppressant.

Air quality and radioactive particle recovery is accomplished by the electrostatic radioactive particle recovery subsystem 12. In operation, an air sweep hood 13 attached to the inner containment building 11, draws air directly from the dig face 22. The air flow velocity across the retrieval area is between 40 and 50 feet per minute in a laminar and uniform manner to limit eddy currents and backflow, which would otherwise disrupt and spread contaminates. The air then travels through ducts 14 to an exhaust air prefilter and separator 15, where it then passes to an organic filtering system 16 where a final filtering occurs. The air is then exhausted out of the outer containment area 1 by an exhaust blower 17 through an exhaust stack 18. Concurrently, fresh air is blown into the outer containment building 1 via motorized dampers and air circulators 19.

Figures 3, 4:
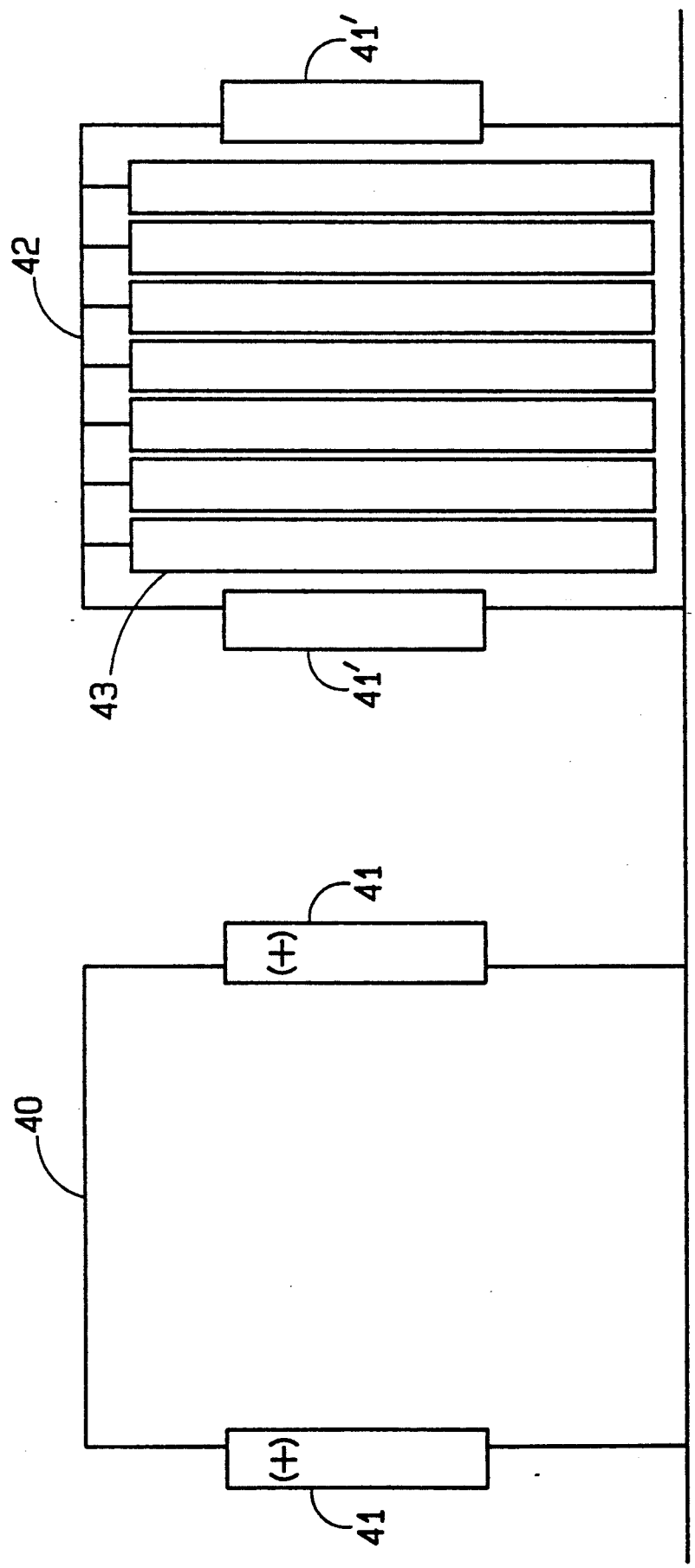
FIG. 3 is an embodiment of an entry/exit way having positively charged sections to create an electrostatic curtain.
FIG. 4 is another embodiment of an entry/exit way incorporating positively charged plastic strips.

Electrostatic curtains are placed strategically throughout the air recirculation system. Electrostatic curtains are derived from the method of 1). negatively charging a series of plates; and 2). passing radioactive particles across the plates, whereby the positively charged particles are attracted to the negative charge of the plates and are captured. The method allows the entire inner containment structure 11 to act as a curtain, as well as, the exhaust air prefilter 15. Openings are constructed so that entry and exit points 21 also act as radioactive particle shields. FIGS. 3 and 4 show two embodiments of the electrostatic curtains. Entry point 40 has charged panels 41 that repel radioactive dust particles. Exit point 42 shows an embodiment including charged panels 41', as well as, positively charged electrostatic strips 43.

One of the means for the abatement of airborne particles of TRU waste is the control of soil moisture in and around the dig face 22 The addition and retention of water in finely textured soils is a well known dust control measure. Previous contamination control studies have shown that a moisture content of approximately 13% by mass, indicate a tolerance to mechanical agitation without emitting airborne dust particles. Therefore, maintaining this moisture content in an opened face dig is a primary strategy to control airborne emissions. Immediately following the removal of the top soil, a moisture fixing compound 25 is applied to the newly exposed soil surface to prevent the escape of the moisture beneath it. The application may either be manual or by remote means. The application of a moisture enhancement may be necessary as the dig face 22 is exposed and subject to the drying effects of the open air interface.

Figure 5:
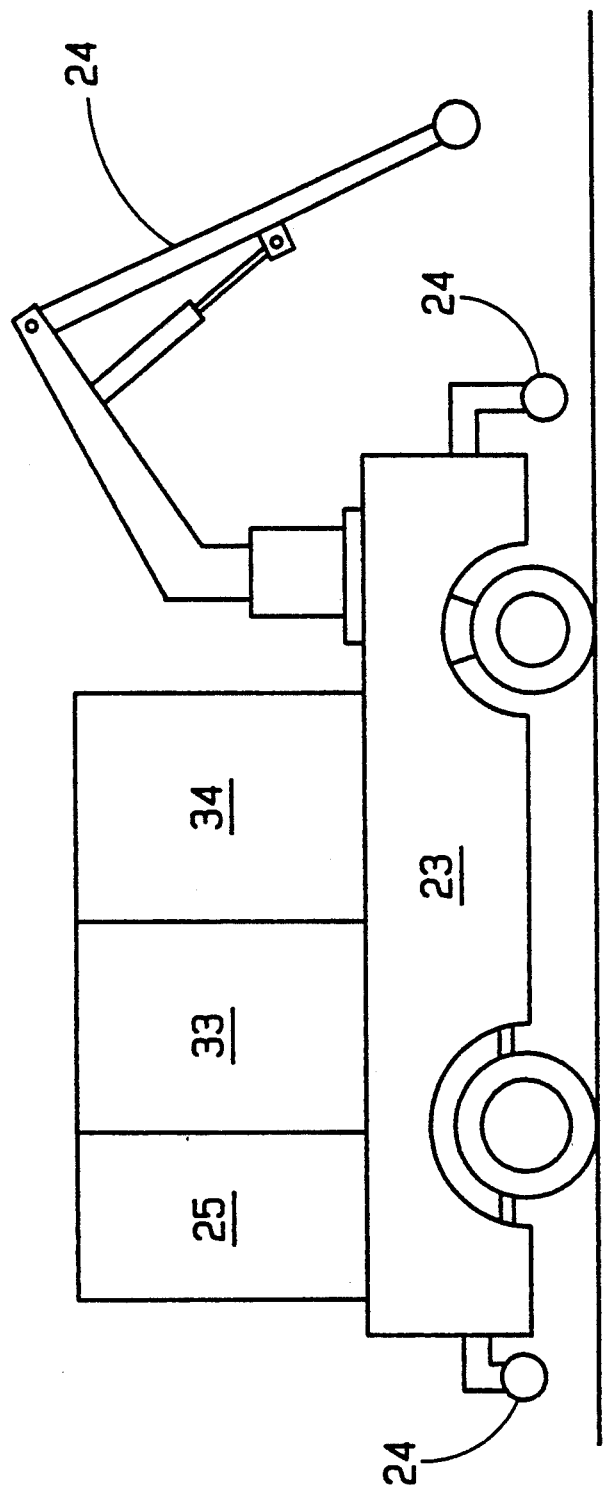
FIG. 5 is a remotely operated vehicle with fixant tanks and spray booms.
Figure 6:
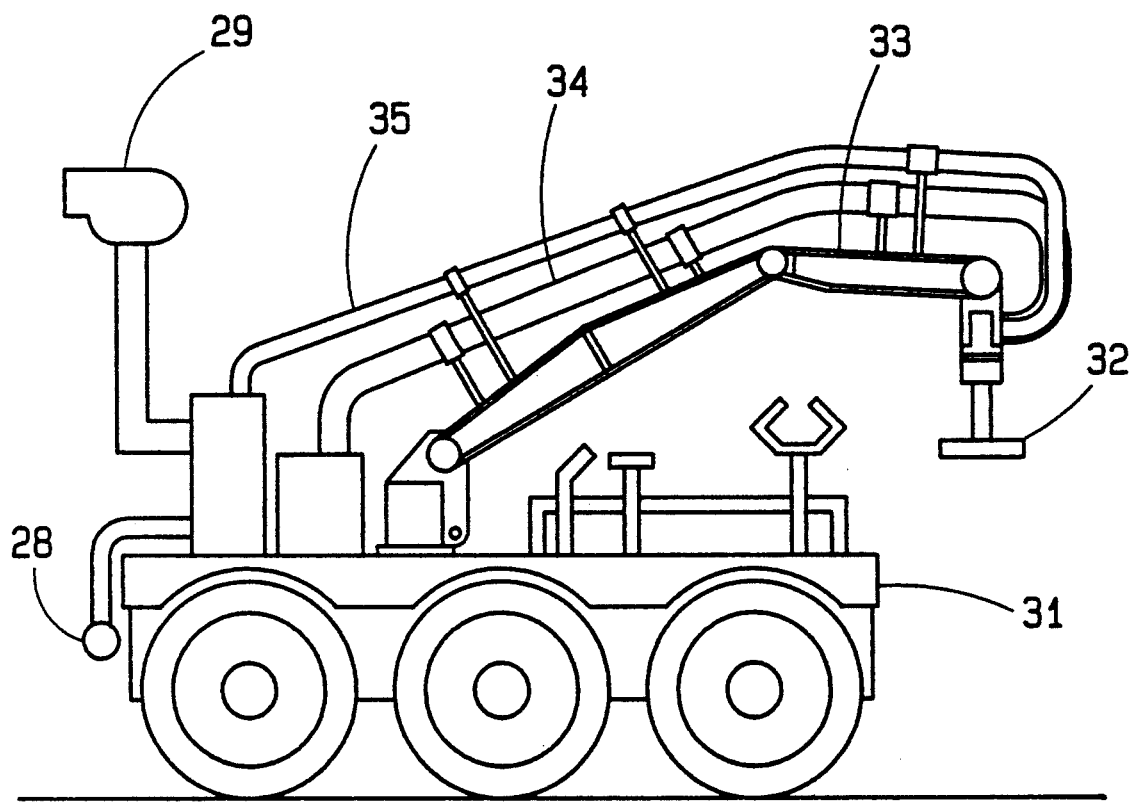
FIG. 6 is a remotely operated vehicle having a mobile alpha CAMS and robotic arm.

In FIGS. 5 and 6, the application of the moisture control agents is accomplished with a spray boom 24 attached to a multi-purpose vehicle 23, spray booms attached to the air sweep hood 12, or booms and nozzles strategically placed within the outer and inner containment areas, 1 and 2. This multi-purpose vehicle 23 is remotely operated and may also carry fire suppressant chemicals. During retrieval operations waste bearing soil is transported by excavation equipment 26 and other vehicles 27 to various areas behind the dig face. This material is susceptible to dust emissions as is material in the dig face, warranting the application of dust suppression compounds such as magnesium chloride 25 and the like 33 and 34, to surfaces exposed to vehicular traffic. Remote or manned spray booms 28 are used to apply the chemical compounds. The remote operated vehicle 31 is a multi-tasked vehicle. It has a tool holder 32, connected to a robotic arm 33, which allows the operator to perform a multitude of individual tasks. A vacuum hose 34 is provided to collect soil samples to determine the moisture content. A fixant hose 35 is attached to the tool holder 32 so that a directed area can be saturated with a chemical compound, while continuing to work with the robotic arm 33.

Figure 7:
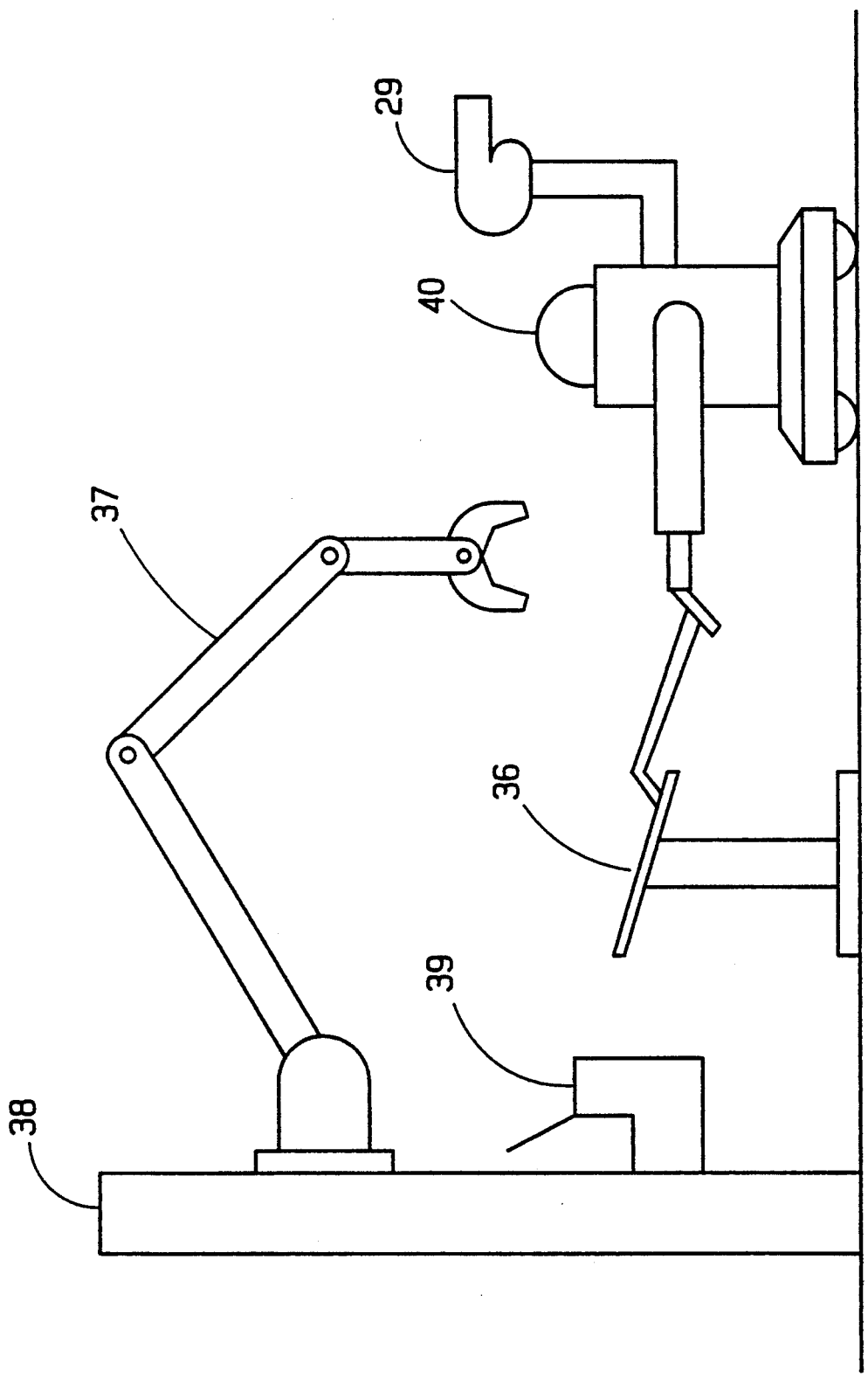
FIG. 7 is an embodiment of a remote site collection/work area including Alpha CAMS used to measure airborne contaminate concentrations.

To monitor the spread of contaminates, the contaminate rapid monitoring subsystem includes state of the art commercially available alpha constant air monitors (CAMS) 29. FIG. 7 shows remote site collection/work area Alpha CAMS 29 are used to measure airborne contaminate concentrations. Remote smears with alpha liquid scintillation are used to measure surface contamination at surface area 36. A robotic manipulator arm 37 allows the operator to move objects at the work site. Partition 38 acts as an electrostatic radioactive particle recovery barrier with a sample retriever 39 to receive samples from the contaminate area. The monitoring subsystem has a fast turnaround system that allows less than an hour analysis of airborne and surface TRU radionuclide contamination. The subsystem provides constant monitoring of the inner and outer containment areas, and at the direction of a computer interface direct the manned and remote moisture and electrostatic control features to correct or compensate for the various levels of contaminates. During a retrieval operation a rapid monitoring system displays an hourly contamination level status for all areas associated with retrieval including inner and outer containment areas and repackaging and recovery sites. Alpha CAMS 29 are placed throughout the inner and outer containment areas with remote calibrating capability. Alpha CAMS on mobile robotic manipulators 40 throughout the retrieval areas provide on line readings, and are processed through the system PC-based computer system which post hourly readings and controls the system's standard alarms. Remote multi-purpose robotics vehicles provide the means to obtain the smears required to perform the alpha liquid scintillation analysis. In addition, a small standard laboratory, adjacent to the control building, analyzes the smears and monitors beta and gamma emissions.

Figure 8:
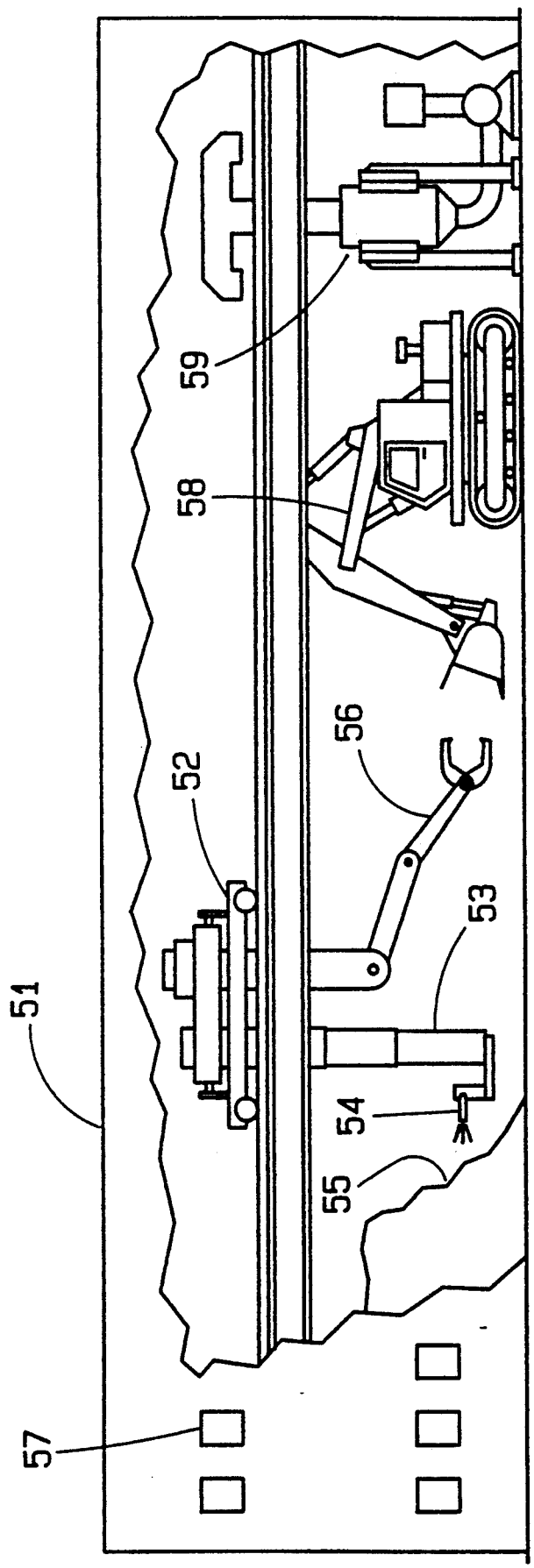
FIG. 8 is another embodiment of the inner containment area.

FIG. 8 depicts an embodiment of a larger inner containment area 51. Inside the containment area 51 a bridge crane 52 carries a telescoping mast 53. Spray wands 54 are also carried by the crane 52 which allows remote access to the dig face 55. Dust suppressant chemicals are applied via the spray wands 54. A manipulator arm 56 provides a remote operator the ability to move and dislodge large objects. The walls of the inner containment area 51 is constructed of electrostatic sheets, louvers 57 are provided to allow ventilation and repel escaping particles. A remotely operated excavator 58 allows personnel to move large amounts of earth. An air recovery recirculation system 59 using HEPA filters provides continuous air particle removal within the inner containment area.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A system for contamination control of transuranic waste, comprising:
   an outer containment building;
   an inner containment building, within said outer containment building;
   means for electrostatic radioactive particle recovery connected to and in communication with said inner and outer containment buildings, and including a sweep hood connected to said inner containment building for drawing exhaust gases from an excavation area in said inner containment building; and
   a moisture control subsystem having the ability to monitor and control surface and airborne contaminate conditions in said inner and outer containment buildings.

2. A system for contamination control of transuranic waste as recited in claim 1, wherein said outer containment building further comprises:
   a recovery and repackaging area within said outer containment building.

3. A system for contamination control of transuranic waste as recited in claim 1, wherein said means for electrostatic radioactive particle recovery further comprises:
   an exhaust prefilter and separator attached to and receiving said exhaust gases from said sweep hood, and an organic filtering system in communication with said exhaust prefilter and separator removing all non-radioactive particles and sending said exhaust gases to an exhaust stack for release to the atmosphere.

4. A system for contamination control of transuranic waste as recited in claim 3, wherein said means for electrostatic radioactive particle recovery further comprises:

5. A system for contamination control of transuranic waste as recited in claim 4, wherein said means for electrostatic radioactive particle recovery further comprises:
   means for importing a positive charge to a surface area; and
   means for passing radionuclide particles across said surface area.

6. A system for contamination control of transuranic waste as recited in claim 3, wherein said means for electrostatic radioactive particle recovery further comprises a hardened plastic sheet carring a positive charge.

7. A system for contamination control of transuranic waste as recited in claim 1, wherein said moisture control system comprises:
   means for monitoring contaminate levels and said means for monitoring having means for sampling air and surface areas, means for analyzing contaminate levels, means for directing manned and remote vehicles to apply dust suppression enhancement compounds, and means for displaying contaminate levels.

8. A system for contamination control of transuranic waste as recited in claim 7, wherein said means for monitoring contaminate levels further comprises:
   a preselected number of alpha CAMS located throughout said inner and outer containment buildings; and
   a control center having the ability to receive information from and communicate with said alpha CAMS.

9. A system for contamination control of transuranic waste as recited in claim 8, wherein said recovery and repackaging area comprises:
   means for sorting, separating, and repackaging transuranic waste.

10. A system for contamination control of transuranic waste as recited in claim 8, wherein said means for sorting, separating, and repackaging comprises:
    segregation equipment, said segregation equipment including a shaker screen, a trommel, a waste container, and a conveyor system.

11. A system for contamination control of transuranic waste as recited in claim 7, wherein said means for sampling air and surface areas comprises:
    a preselected number of robotic arms and an alpha CAMS affixed upon a movable tripod.

* * * * *